(No Model.)
J. N. BANNON.
CAR COUPLING.
No. 532,519. Patented Jan. 15, 1895.
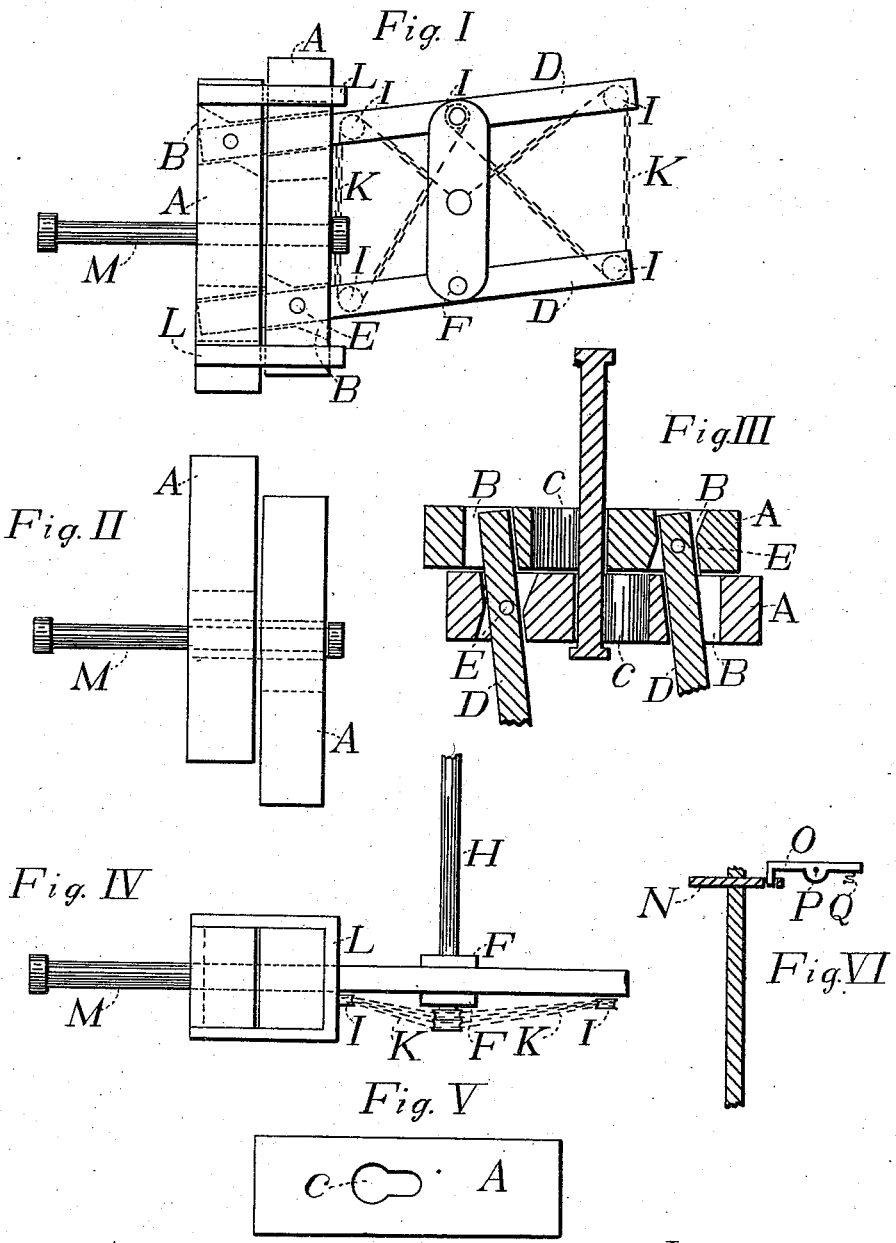
Witnesses:
C. Morton Ayres.
Emma Hickel.
Inventor:
John N. Bannon
per Eugene Ayres,
Attorney.

UNITED STATES PATENT OFFICE.

JOHN N. BANNON, OF ST. JOSEPH, MISSOURI.

CAR-COUPLING.

SPECIFICATION forming part of Letters Patent No. 532,519, dated January 15, 1895.

Application filed July 23, 1894. Serial No. 518,348. (No model.)

*To all whom it may concern:*

Be it known that I, JOHN N. BANNON, a citizen of the United States, residing at St. Joseph, in the county of Buchanan and State of Missouri, have invented certain new and useful Improvements in Car-Couplers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in car couplers and the object of my improvements is to provide a coupler especially adapted to freight cars, and in using which it will be unnecessary in making up trains or detaching cars, for any one to go between the cars; thus saving labor and time and lessening the danger to life.

I attain my object by the mechanism illustrated in the accompanying drawings, in which—

Figure I is a bottom view of my entire invention; Fig. II, a top view of the draw-head and coupling pin; Fig. III, a horizontal section of draw-head and coupling pin; Fig. IV, a side view of my invention; Fig. V, a top view of draw-head when closed and in position to hold the coupling pin, and Fig. VI, is a section of the brake rod with wheel and catch.

Similar letters refer to similar parts throughout the several views.

My invention consists of a coupling pin M which passes through draw-head pieces A A, which pieces are counterparts of each other in size and form. The openings C through which the coupling pin passes are alike in form but reversed in position. Through the openings B B B B pass the arms D D one of which fastens to the forward draw-head and the other to rear draw-head by means of pins E E. Arms D D are attached to each other by cross bars F F. A chain, K, with ends fast at the middle of the lower cross bar F passes around pulley wheels I I I I I and the guard wheel at the lower end of upright rod H.

Straps L L bind the draw head pieces A A together. By revolving rod H as a car brake one end of the chain loosens while the other tightens and thus shifts the arms D D which carry the draw head pieces and coupling pin. The cross bars F F are rigidly fastened to the car frame.

Fig. 3 shows the coupling pin M ready to receive the draw head of the next car.

To keep the draw head piece from slipping in transit a notched wheel N is attached to rod H near the top of the car and a catch O turning on a hinge P and pressed against wheel N by a spiral spring Q is provided. The catch may be lifted off wheel N by pressing the spring end of O with the foot.

What I claim, and desire to secure by Letters Patent of the United States, is—

1. The combination in a car coupler of coupling pin M passing through draw-head A A and controlled by arms D D and chain K, said arms moving in slots in draw-head A A and said chain passing around pulleys on arms D D and upright rod H, substantially as described and for the purpose set forth.

2. In combination, a draw-head constructed of two corresponding sliding bars A A and coupling pin M passing through said draw-head, arms D D passing through slots in said draw-head and controlled by attached brake rod H and chain K, substantially as described.

3. In a car coupler brake rod H carrying chain K, also carried by pulley wheels I I I I I attached to arms D D, in combination with coupling pin M and draw-head A A near the ends of which are slots B B B B.

4. In a car coupler rod H carrying chain K around pulleys I I I I I, arms D D swinging sliding draw head pieces A A, and coupling pin M, in combination with wheel N and catch O on hinge P, said catch having spiral spring Q, substantially as described and for the purpose specified.

In testimony whereof I affix my signature in presence of two witnesses.

JOHN N. BANNON.

Witnesses:
 EMMA HECKEL,
 R. IMBODEN.